United States Patent
Basu et al.

(10) Patent No.: US 9,547,835 B2
(45) Date of Patent: Jan. 17, 2017

(54) MODULARLY MANAGED SERVICE PLATFORM

(71) Applicant: International Business Machines Corporation, Armonk, NY (US)

(72) Inventors: Gaurab Basu, New Delhi (IN); Praveen Jayachandran, Bangalore (IN); Deepak Jeswani, Ajmer (IN); Ravi Kothari, New Delhi (IN); Shripad Nadgowda, Nagpur (IN); Akshat Verma, New Delhi (IN); Balaji Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 13/970,881

(22) Filed: Aug. 20, 2013

(65) Prior Publication Data
US 2015/0058054 A1   Feb. 26, 2015

(51) Int. Cl.
*G06Q 10/00* (2012.01)
*G06Q 10/06* (2012.01)

(52) U.S. Cl.
CPC ............... *G06Q 10/06311* (2013.01)

(58) Field of Classification Search
CPC ............ G06Q 10/00; G06F 1/00; H04L 1/00
USPC . 705/7.11–7.42; 709/201–207; 726/2; 718/1, 100
See application file for complete search history.

(56) References Cited

U.S. PATENT DOCUMENTS 7,779,092 B2 *   8/2010   Rive .................. H04L 29/06
                                                            709/203
8,271,655 B2     9/2012   Dawson et al.
8,327,441 B2 *  12/2012   Kumar et al. ................ 726/22
8,380,837 B2     2/2013   Dawson et al.
8,924,559 B2 *  12/2014   Brown ................... G06Q 10/10
                                                            709/223
9,262,190 B2 *   2/2016   Gombert ............. G06F 9/45533
2004/0119752 A1* 6/2004   Beringer .......... G06Q 10/06313
                                                            715/779
2011/0138047 A1* 6/2011   Brown ................... G06Q 10/10
                                                            709/226
2011/0238582 A1* 9/2011   Dasari ................ G06Q 30/0283
                                                            705/80
2012/0216244 A1* 8/2012   Kumar .................... G06F 21/57
                                                            726/1
2012/0233668 A1* 9/2012   Leafe .................... G06F 9/5022
                                                            726/4

(Continued)

OTHER PUBLICATIONS

Viswanathan et al.; Rapid Adjustment and Adoption to Mlaas Clouds; Middleware 2012 Industry Track, Dec. 3-7, 2012; 6 pages.

(Continued)

*Primary Examiner* — Alan S Miller
*Assistant Examiner* — Joseph Waesco
(74) *Attorney, Agent, or Firm* — Schmeiser, Olsen & Watts; John Pivnichny (57) ABSTRACT

A service method and associated system is provided. The method includes generating event types for events and services associated with the events. Virtual or physical machines associated with the services are provisioned and a message associated with a first event is published. The message is routed to a queue of a second service and the second service is notified of the message. The services are enabled and a selection for a sub-set of the services is received. The selection is enabled.

9 Claims, 5 Drawing Sheets (56) References Cited

U.S. PATENT DOCUMENTS

| | | | |
|---|---|---|---|
| 2013/0019015 A1 | 1/2013 | Devarakonda et al. | |
| 2013/0060933 A1* | 3/2013 | Tung ................... | G06F 11/3495 709/224 |
| 2013/0066940 A1 | 3/2013 | Shao | |
| 2014/0149591 A1* | 5/2014 | Bhattacharya ...... | H04L 67/1097 709/226 |
| 2014/0237464 A1* | 8/2014 | Waterman ................. | G06F 8/65 717/172 |
| 2015/0143363 A1* | 5/2015 | Gombert ............ | G06F 9/45533 718/1 |

OTHER PUBLICATIONS

Introduction to Amazon CloudWatch; Amazon CloudWatch Developer Guide; API Version Aug. 1, 2010; Aug. 8, 2010; 6 pages.

Heffner, Randy; Taking the Fog Out of Cloud Computing: Infrastructure-as-a-Service; Forrester Research Inc.; Mar. 11, 2010; 21 pages.

* cited by examiner

MODULARLY MANAGED SERVICE PLATFORM

FIELD

One or more embodiments of the invention relates generally to a method and associated system for managing services, and in particular to a method and associated system for modularly managing a service platform.

BACKGROUND

Performing management functions typically includes an inaccurate process with little flexibility. Providing an efficient method for determining a basis for managing may include a complicated process that may be time consuming and require a large amount of resources. Accordingly, there exists a need in the art to overcome at least some of the deficiencies and limitations described herein above.

SUMMARY

A first embodiment of the invention provides a method comprising: generating, by a computer processor of a computing system, multiple event types for a plurality of events; generating, by the computer processor, a plurality of services associated with said plurality of events, the plurality of services comprising a platform provided service, a customer provided service, and/or a third party provided service; provisioning, by the computer processor, a plurality of virtual or physical machines associated with the plurality of services; publishing, by the computer processor executing a first service of the plurality of services via an exchange associated with a first event of the plurality of events, a first message associated with the first event; routing, by the computer processor to a queue of a second service of the plurality of services, the first message; notifying, by the computer processor, the second service of the first message within the queue; enabling, by the computer processor based on the provisioning, the platform provided service, the customer provided service, and/or the third party provided service; receiving, by the computer processor from a user during the provisioning, a selection comprising a sub-set of the platform provided service, the customer provided service, and/or the third party provided service; and enabling, by the computer processor, the selection.

A second embodiment of the invention provides computer program product, comprising a computer readable hardware storage device storing a computer readable program code, the computer readable program code comprising an algorithm that when executed by a computer processor of a computer system implements a method, the method comprising: generating, by the computer processor, multiple event types for a plurality of events; generating, by the computer processor, a plurality of services associated with the plurality of events, the plurality of services comprising a platform provided service, a customer provided service, and/or a third party provided service; provisioning, by the computer processor, a plurality of virtual or physical machines associated with the plurality of services; publishing, by the computer processor executing a first service of the plurality of services via an exchange associated with a first event of the plurality of events, a first message associated with the first event; routing, by the computer processor to a queue of a second service of the plurality of services, the first message; notifying, by the computer processor, the second service of the first message within the queue; enabling, by the computer processor based on the provisioning, the platform provided service, the customer provided service, and/or the third party provided service; receiving, by the computer processor from a user during the provisioning, a selection comprising a sub-set of the platform provided service, the customer provided service, and/or the third party provided service; and enabling, by the computer processor, the selection.

A third embodiment of the invention provides computer system comprising a computer processor coupled to a computer-readable memory unit, the memory unit comprising instructions that when executed by the computer processor implements a method comprising: generating, by the computer processor, multiple event types for a plurality of events; generating, by the computer processor, a plurality of services associated with the plurality of events, the plurality of services comprising a platform provided service, a customer provided service, and/or a third party provided service; provisioning, by the computer processor, a plurality of virtual or physical machines associated with the plurality of services; publishing, by the computer processor executing a first service of the plurality of services via an exchange associated with a first event of the plurality of events, a first message associated with the first event; routing, by the computer processor to a queue of a second service of the plurality of services, the first message; notifying, by the computer processor, the second service of the first message within the queue; enabling, by the computer processor based on the provisioning, the platform provided service, the customer provided service, and/or the third party provided service; receiving, by the computer processor from a user during the provisioning, a selection comprising a sub-set of the platform provided service, the customer provided service, and/or the third party provided service; and enabling, by the computer processor, the selection.

The present invention advantageously provides a simple method and associated system capable of performing management functions.

DETAILED DESCRIPTION

Figure 1:
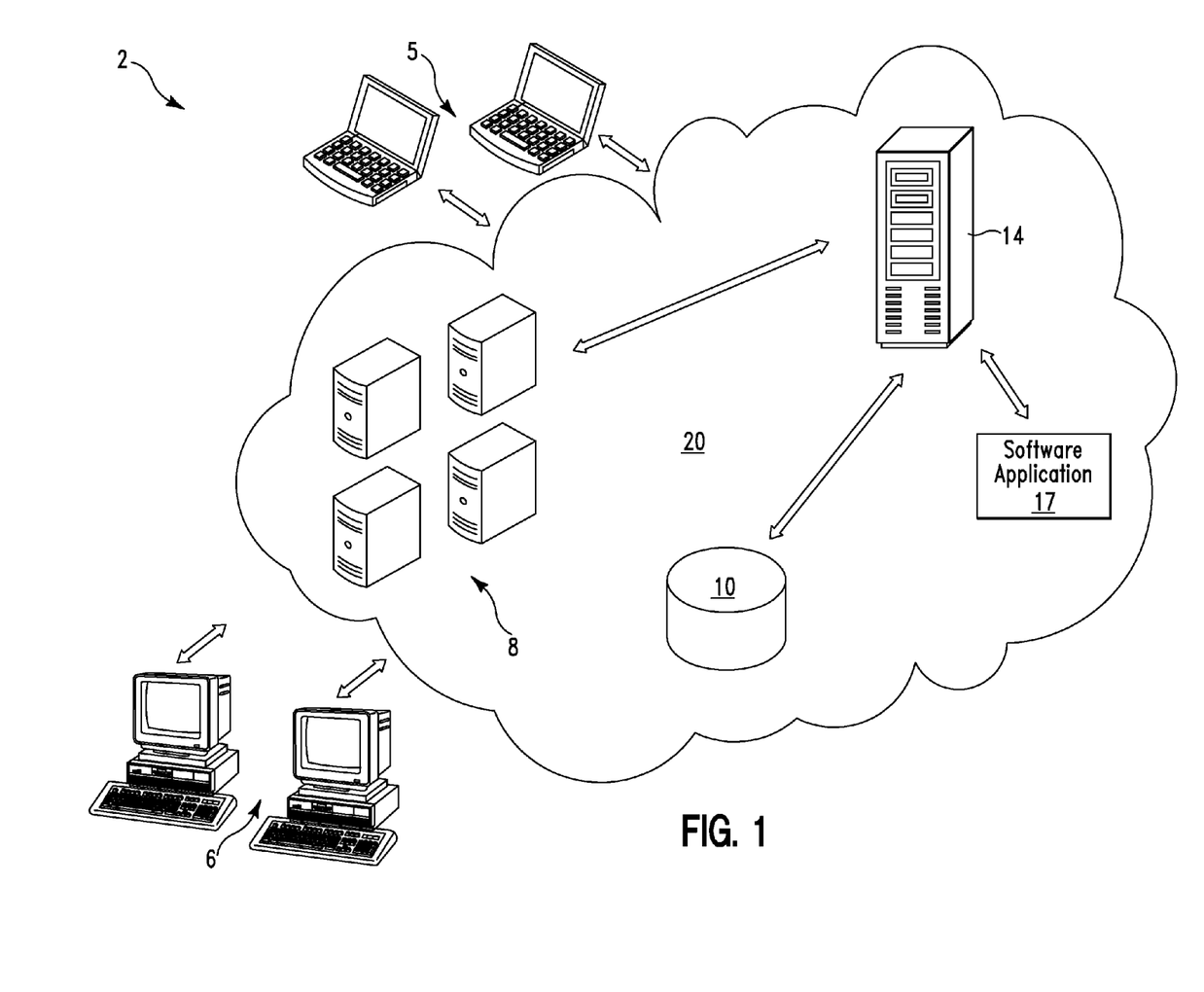
FIG. 1 illustrates a system for modularly managing a service using a network of remote servers hosted on the Internet, in accordance with embodiments of the present invention.

FIG. 1 illustrates a system 2 for modularly managing a service using a network 20 of remote servers 8 hosted on the Internet, in accordance with embodiments of the present invention. System 2 enables a method for retrieving user initiated services to network 20 using application programming interfaces (APIs), virtual machines (VMs), and events by implementing a managed infrastructure as a service (MIAAS) platform thereby allowing:
1. A platform provider to provide managed services.
2. A third party vendor to provide managed services.
3. Customers to bring their own managed (dedicated or shared) services.

System 2 comprises network 20 connected to terminals 5 and 6. Network 20 comprises a controller server 14 connected to remote servers 8, a software application 17, and a database(s) 10. System 2 enables the following network types:
1. A hardware infrastructure as a service for providing virtual machines as a service, an operating system, and applications.
2. A managed infrastructure as a service for providing full service virtual machines. A service contract may include providing software services for an underlying virtual machine. The services may include, inter alia, software upgrades, patch support, support for compliance, license management etc. for a provided software infrastructure.

Network 20 allows:
1. A user to select a subset of managed services from a provider.
2. A user to run some services on a same managed network.
3. Services to be built on top of each other.
4. Loosely coupled integration of user management systems with any other type of management systems.

System 2 enables a method such that when a VM is provisioned, a set of selected managed services will be installed and configured on the VM. Selected services may include, inter alia, MIaaS services, customer services, etc. Each managed service provides a set of standard APIs that allow:
1. A service bootstrap.
2. Registering a VM for a service.
3. De-registering a VM for a service.
4. Listening to subscribed events.
5. Integration framework of Managed Service APIs with a MIaaS platform.
6. A service-host install script to be run for service bootstrapping.
7. An install script to be run during provisioning to install a service on a VM.
8. A configure script to be run to configure a service for a VM.
9. A common portal to display basic service details.
10. An event framework for inter-service and service-platform interaction.
11. A platform to implement a publish-subscribe service.
12. Services that may register event types and publish events for any registered event types.
13. Services that may subscribe to event types.

Services may include the following service types:
1. Public service: A public service comprises a service available to all customers registered on an MIaaS platform.
2. Private service: A private service comprises a service available to one or a pre-specified set of customers.
3. Untrusted service: An untrusted service comprises a service that is untrusted and is not allowed to perform any actions on an associated platform.
4. Trusted service: A trusted service comprises a service that may perform actions on the platform (e.g., on hypervisors). Trusted services comprise public services created by the MIaaS platform provider or a trusted source.

System 2 enables a process for modularly managing a service platform as follows:
1. Event types are created.
2. Services are created with or without event types.
3. One or more virtual/physical machines are provisioned. Provisioning a virtual/physical machine requires at least one service (i.e., a provisioning service(s).
4. Messages are passed between services.

Creating event types comprises:
A. Creating a unique exchange for each event type.
B. Registering the created event in an event register.

Creating a service comprises:
A. Uploading, installing, and configuring scripts (for an associated service) in a script repository managed by a script execution manager.
B. Registering event types that the associated service will publish in the event register.
C. Registering event types that the associated service will subscribe to in the event register. A unique queue is created for each service/event type pair and the queue is connected to an exchange corresponding to the event type.
D. Registering a service with information regarding associated scripts, SLAs, and additional arguments in a service register.

Creating a virtual/physical machine comprises:
A. Selecting (by a user) one or more services (including a provisioning service as a first service) for a new virtual machine. Additionally, the user selects a resource configuration (e.g., CPU/memory resources required) and image file to use for the provisioning.
B. Creating a plan comprising a sequence of steps. Each step is configured to execute an install script or a configure script for a selected service.
C. A plan and request are added to a provisioning queue.
D. A choreographer module retrieves a request from the head of the provisioning queue.
E. A script execution manager executes each step of the plan (i.e., each script) in sequence.
F. Executing all steps of the plan thereby provisioning a VM with all requested services.

Passing messages between services comprises:
A. A service (e.g., a service A) publishes an event via an event message transmitted to an exchange for the event.
B. The event message is routed to the queues of each subscribing service (e.g., a service B, a service C, etc.).
C. Each subscribing service (e.g., service B) is notified of the event message in its queue thereby enabling an associated action.

System 2 enables a process allowing data exchange between services. For example, system 2 enables data exchange between a composite service and component services. Additionally, system 2 enables data exchange between a service and impacted services. Data exchange between a composite service and component services uses APIs provided by the service to retrieve data generated by the service (e.g., a placement service retrieves resource usage data from a monitoring service). The two services are responsible for transport. Data exchange between a service and impacted services comprises a platform providing a publish-subscribe mechanism to receive and notify events.

Figure 2:
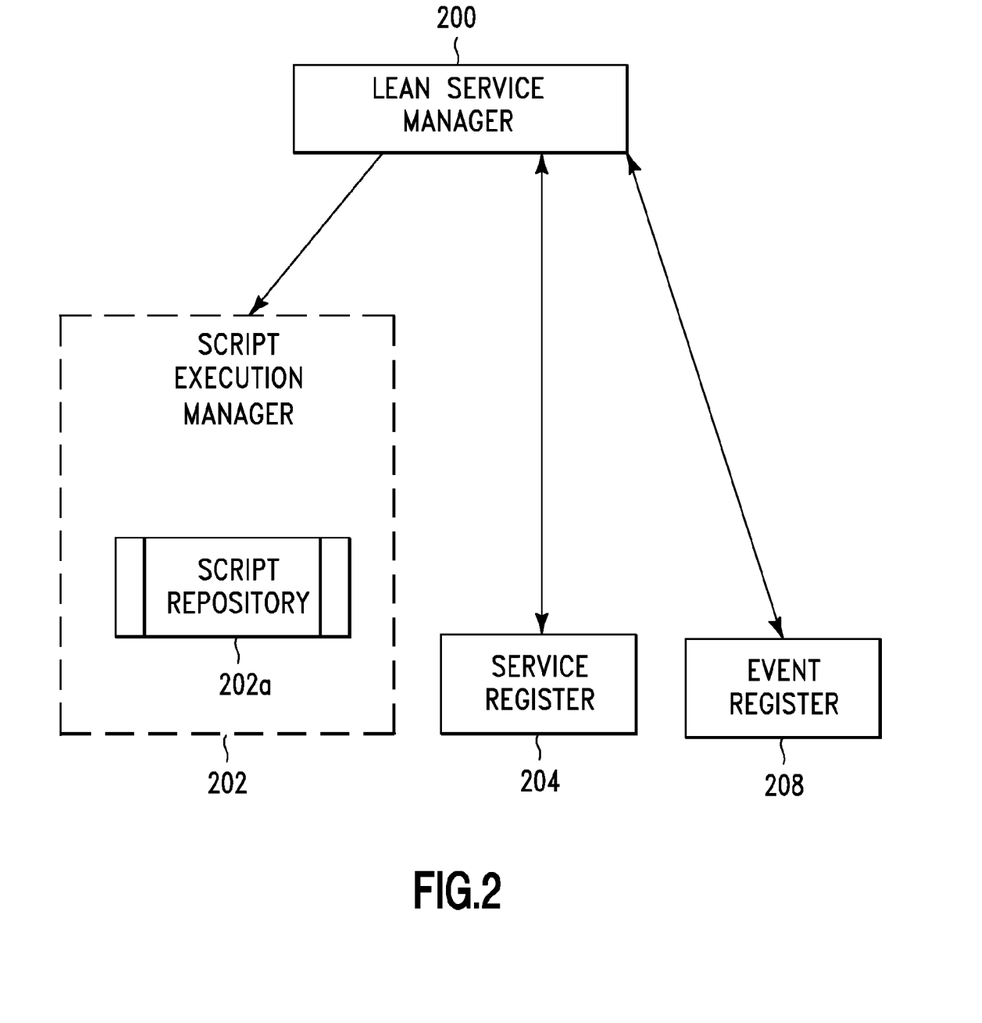
FIG. 2 illustrates an internal process flow detailing a service creation process enabled by the software application of FIG. 1, in accordance with embodiments of the present invention.

FIG. 2 illustrates an internal process flow detailing a service creation process enabled by software application 17 of FIG. 1, in accordance with embodiments of the present invention. A lean service manager 200 generates a service request. A script execution manager uploads, installs, and configures scripts (associated with the service request) via a script repository 202a. A service register 204 registers the service, scripts, and arguments. An event register adds and subscribes to the events.

Figure 3:
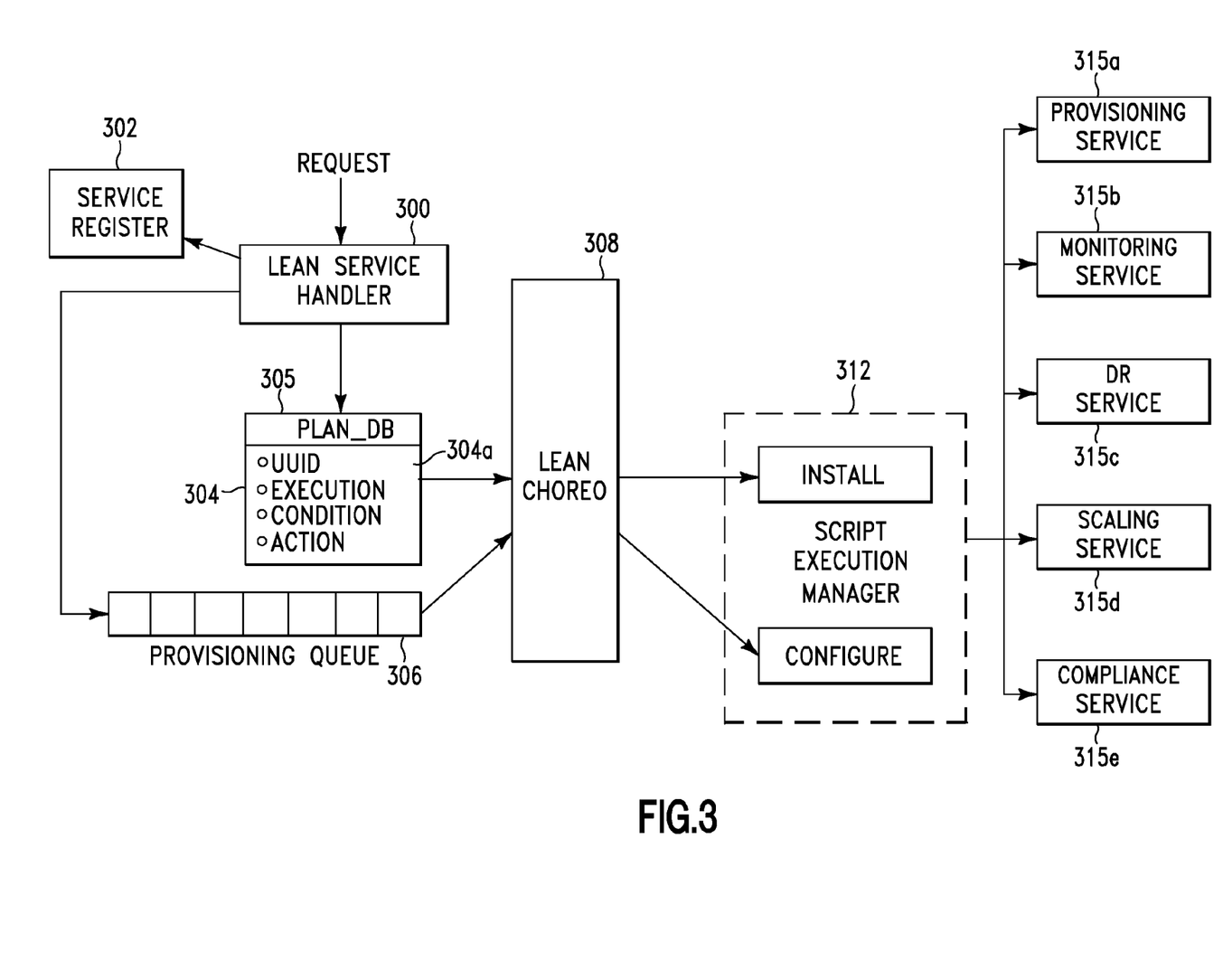
FIG. 3 illustrates an internal process flow detailing a provisioning process enabled by the software application of FIG. 1, in accordance with embodiments of the present invention.

FIG. 3 illustrates an internal process flow detailing a provisioning process enabled by software application 17 of FIG. 1, in accordance with embodiments of the present invention. A lean service handler 300 receives a service request from a service register 302. A plan 304 comprising steps (or scripts) 304a is generated and stored in a database 305. The request and plan are stored in a provisioning queue 306. A lean choreographer module 308 retrieves the request from the provisioning queue 306. A script execution manager 312 executes steps 304a, thereby installing and configure a virtual machine with selected services such as, inter alia, a provisioning service 315a, a monitoring service 315b, a DR service 315c, a scaling service 315d, and a compliance service 315e.

Figure 4:
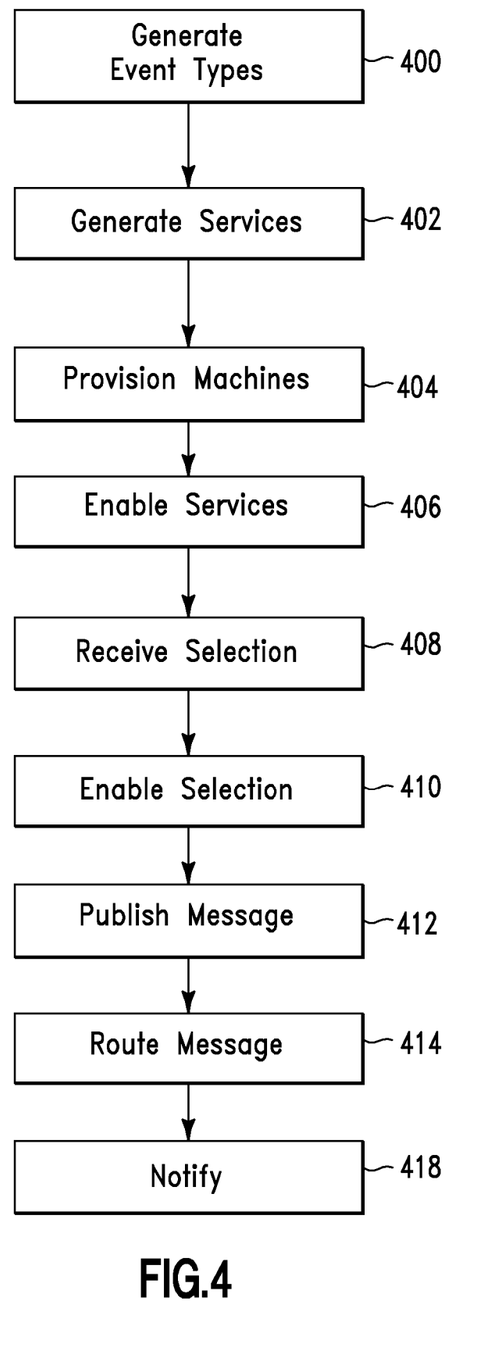
FIG. 4 illustrates an algorithm detailing a process flow enabled by the system 2 of FIG. 1, in accordance with embodiments of the present invention.

FIG. 4 illustrates an algorithm detailing a process flow enabled by system 2 of FIG. 1, in accordance with embodiments of the present invention. Each of the steps in the algorithm of FIG. 1 may be enabled and executed by a computer processor executing computer code. In step 400, multiple event types for events are generated by: creating a unique exchange for each event type and registering a first event in an event register. In step 402, services associated with the events are generated. The services may include a platform provided service, a customer provided service, and/or a third party provided service, etc. Generating the services may include the following process:
1. Uploading scripts associated with the first service and a second service to a script repository managed by a script execution manager.
2. Installing the scripts in the script repository.
3. Configuring the scripts in the script repository.
4. Registering a group of the multiple event types that the services will publish in the event register.
5. Registering an additional group of the multiple event types that the services will subscribe to in the event register.
6. Generating unique queues for pairs of event types of the multiple event types and associated service types of the services.
7. Connecting each queue of the unique queues to an associated unique exchange corresponding to an associated event type of the multiple event types.
8. Registering (in a service register) the services with information describing associated scripts of the service.

In step 404, a plurality of virtual or physical machines associated with the services are provisioned. Provisioning the plurality of virtual or physical machines may include the following process:
1. Receiving (from a user) a selection for one or more services (of the services) for application to a new virtual or physical machine of the plurality of virtual or physical machines.
2. Receiving (from the user), a selection for a resource configuration and image file for use in the provisioning.
3. Generating a plan comprising a sequence of steps for configuring the scripts for selected services.
4. Adding the plan and an associated request to a provisioning queue.
5. Retrieving the request from the provisioning queue.
6. Executing each script of in a specified sequence.

In step 406, the platform provided service, the customer provided service, and/or the third party provided service are enabled. In step 408, a selection comprising a sub-set of the platform provided service, the customer provided service, and/or the third party provided service is received from the user. In step 410, the selection is enabled. In step 412, a first message associated with first event is published. In step 414, the first message is routed to a queue of a second service. In step 418, the second service is notified of the first message within the queue.

Figure 5:
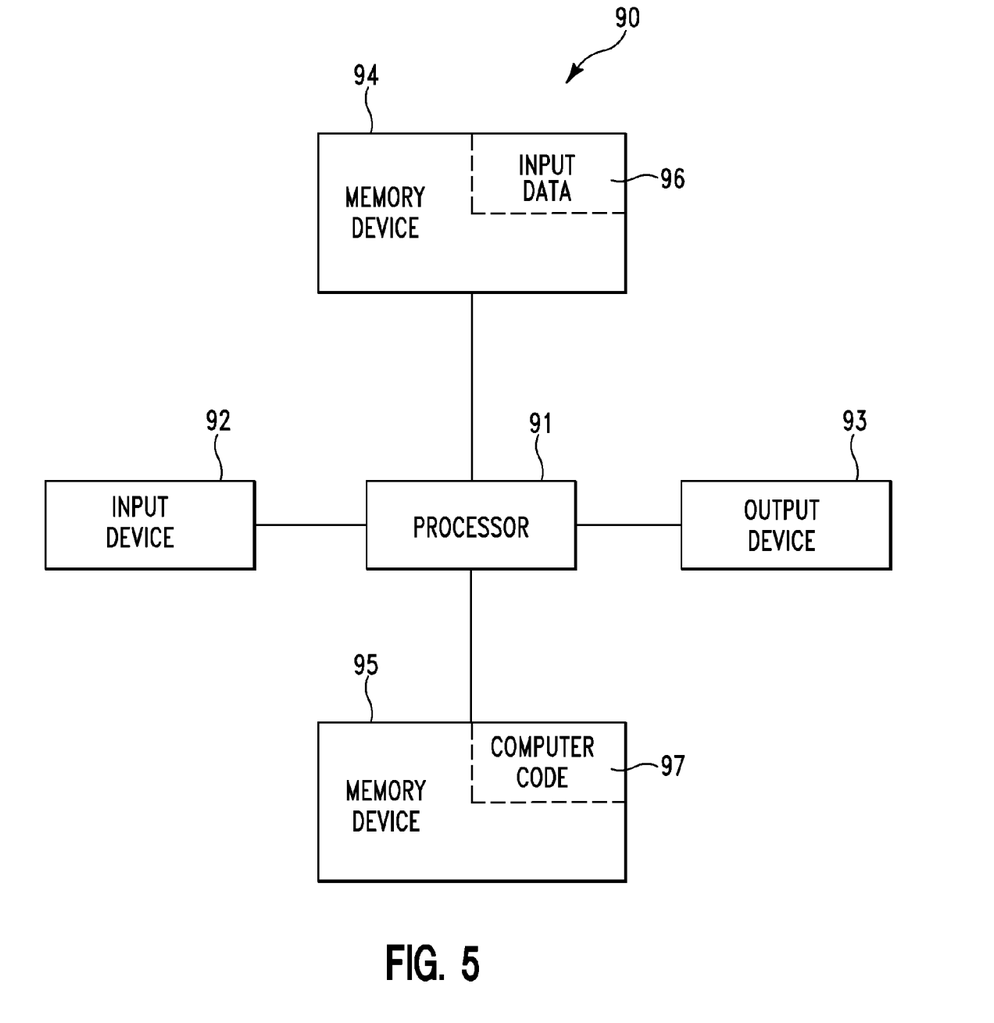
FIG. 5 illustrates a computer apparatus used by the systems and processes of FIGS. 1-4 to modularly manage a service using a network of remote servers hosted on the Internet, in accordance with embodiments of the present invention.

FIG. 5 illustrates a computer apparatus 90 used by the system and processes of FIGS. 1-4 for modularly managing a service using a network of remote servers hosted on the Internet, in accordance with embodiments of the present invention. The computer system 90 includes a processor 91 (or processors in computer systems with multiple processor architecture), an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4) for modularly managing a service using a network of remote servers hosted on the Internet. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may include the algorithm of FIGS. 2-4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to modularly manage a service using a network of remote servers hosted on the Internet. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for modularly managing a service using a network of remote servers hosted on the Internet. In another embodiment, the invention provides a business method that performs the process steps of the invention on a subscription, advertising, and/or fee basis. That is, a service supplier, such as a Solution Integrator, could offer to modularly manage a service using a network of remote servers hosted on the Internet. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A physical machine based service improvement method comprising:
   generating, by a computer processor of a computing system, multiple event types for a plurality of events, wherein said generating said multiple event types comprises:
      creating, by said computer processor, a unique exchange for each event type of said multiple event types; and
      registering, by said computer processor, said first event in an event register;
   generating, by said computer processor, a plurality of services associated with virtual and physical hardware machine based software and hardware improvement services and said plurality of events, said plurality of services executed by a hardware infrastructure implemented by a controller server comprising a specified hardware configuration for enabling a plurality of virtual and physical machines, said plurality of services comprising a platform provided service, a customer provided service, and/or a third party provided service, wherein said services comprise differing service types comprising: a public service type including a service available to all customers registered on managed infrastructure as a service (MIAAS) platform; a private service type including a service available to a pre-specified set of customers; an untrusted service type including an untrusted service that is untrusted and is not allowed to perform any actions on an associated platform; and a trusted service type including a service that may perform actions on said associated platform; and wherein said generating said plurality of services comprises:
      uploading, by said computer processor via a network, scripts associated with said plurality of services to a script repository database managed by a script execution manager;
      registering, by said computer processor, said scripts and associated arguments in an event register;
      installing, by said computer processor, said scripts in said script database repository;
      configuring, by said computer processor, said scripts in said script database repository;
      retrieving, in response to execution of a service host install script, bootstraps associated with said plurality of services;
      uploading said scripts from said script database to a provisioning queue via said network; and
      executing, by said computer processor executing said script execution manager, said scripts;
   creating, by said computer processor, unique queues for said differing service types paired with associated event types of said multiple event types;
   connecting, by said computer processor, said unique queues to associated unique exchanges corresponding to each said event type;
   provisioning, by said computer processor executing an install script and via said network in response to said executing, said plurality of virtual and physical machines associated with said plurality of services, wherein said provisioning comprises generating a resource configuration comprising CPU/memory resources required for implementing said plurality of virtual and physical machines for use in said provisioning, and wherein said provisioning said plurality of virtual and physical machines comprises creating a new virtual and physical machine by;
      receiving, from a user, a selection for one or more virtual and physical hardware machine based software and hardware improvement services of said plurality of services for application to a new virtual and physical machine;
      selecting first CPU and memory resources required for configuring, via execution of a configure script, said new virtual and physical machine, said memory resources comprising a hard drive, dynamic random access memory, and read only memory; and
      installing said one or more virtual and physical hardware machine based software and hardware improvement services, said first CPU and memory resources, and a hardware infrastructure service in said new virtual and physical machine, wherein said plurality of virtual and physical machines comprise said new virtual and physical machine, and wherein said provisioning said plurality of virtual and physical machines comprises:
      receiving, by said computer processor from said user, a selection for an image file for use in said provisioning;
      generating, by said computer processor, a plan comprising a sequence of steps for configuring and installing said scripts for selected services;
      adding, by said computer processor, said plan and an associated request to a provisioning queue;
      retrieving, by said computer processor, said request from a head of said provisioning queue; and
      executing, by said computer processor each script of said scripts in a specified sequence;
   publishing, by said computer processor executing a first service of said plurality of services via an exchange of said associated unique exchanges associated with a first event of said plurality of events, a first message associated with said first event, wherein said exchange is executed via an application programming interface (API) provided by said first service;
   routing, by said computer processor to a queue, of said unique queues, of a second service of said plurality of services, said first message;
   notifying, by said computer processor, said second service of said first message within said queue;
   enabling, by said computer processor based on said provisioning, said platform provided service, said customer provided service, and/or said third party provided service;
   receiving, by said computer processor from a user during said provisioning, a selection comprising a sub-set of said platform provided service, said customer provided service, and/or said third party provided service; and
   enabling, by said computer processor, said selection.

2. The method of claim 1, wherein said generating said plurality of services further comprises:
   registering, by said computer processor, a group of said multiple event types that said plurality of services will publish in said event register;
   registering, by said computer processor, an additional group of said multiple event types that said plurality of services will subscribe to in said event register;
   generating, by said computer processor, unique queues for pairs of event types of said multiple event types and associated service types of said plurality of services;
   connecting, by said computer processor, each queue of said unique queues to an associated unique exchange corresponding an associated event type of said multiple event types; and
   registering, by said computer processor in a service register, said plurality of services with information describing associated scripts of said scripts.

3. The method of claim 1, wherein said plurality of services comprise dedicated services and shared services.

4. The method of claim 1, further comprising:
   providing at least one support service for at least one of creating, integrating, hosting, maintaining, and deploying computer-readable code in said computer processor, said code being executed by the computer processor to implement said generating said multiple event types said plurality of services, said generating said plurality of services, said provisioning, said publishing, said routing, said notifying, said enabling said platform, said receiving, and said enabling said selection.

5. A computer program product, comprising a computer readable hardware storage device storing a computer readable program code, said computer readable program code comprising an algorithm that when executed by a computer processor of a computer system implements a physical machine based service improvement method, said method comprising:
   generating, by said computer processor, multiple event types for a plurality of events, wherein said generating said multiple event types comprises:
      creating, by said computer processor, a unique exchange for each event type of said multiple event types; and
      registering, by said computer processor, said first event in an event register;
   generating, by said computer processor, a plurality of services associated with virtual and physical hardware machine based software and hardware improvement services and said plurality of events, said plurality of services executed by a hardware infrastructure implemented by a controller server comprising a specified hardware configuration for enabling a plurality of virtual and physical machines, said plurality of services comprising a platform provided service, a customer provided service, and/or a third party provided service, wherein said services comprise differing service types comprising: a public service type including a service available to all customers registered on managed infrastructure as a service (MIAAS) platform; a private service type including a service available to a pre-specified set of customers; an untrusted service type including an untrusted service that is untrusted and is not allowed to perform any actions on an associated platform; and a trusted service type including a service that may perform actions on said associated platform; and wherein said generating said plurality of services comprises:
      uploading, by said computer processor via a network, scripts associated with said plurality of services to a script repository database managed by a script execution manager;
      registering, by said computer processor, said scripts and associated arguments in an event register;
      installing, by said computer processor, said scripts in said script database repository;
      configuring, by said computer processor, said scripts in said script database repository;
      retrieving, in response to execution of a service host install script, bootstraps associated with said plurality of services;
      uploading said scripts from said script database to a provisioning queue via said network; and
      executing, by said computer processor executing said script execution manager, said scripts;
   creating, by said computer processor, unique queues for said differing service types paired with associated event types of said multiple event types;
   connecting, by said computer processor, said unique queues to associated unique exchanges corresponding to each said event type;
   provisioning, by said computer processor executing an install script and via said network in response to said executing, said plurality of virtual and physical machines associated with said plurality of services, wherein said provisioning comprises generating a resource configuration comprising CPU/memory resources required for implementing said plurality of virtual and physical machines for use in said provisioning, and wherein said provisioning said plurality of virtual and physical machines comprises creating a new virtual and physical machine by;
      receiving, from a user, a selection for one or more virtual and physical hardware machine based software and hardware improvement services of said plurality of services for application to a new virtual and physical machine;
      selecting first CPU and memory resources required for configuring, via execution of a configure script, said new virtual and physical machine, said memory resources comprising a hard drive, dynamic random access memory, and read only memory; and
      installing said one or more virtual and physical hardware machine based software and hardware improvement services, said first CPU and memory resources, and a hardware infrastructure service in said new virtual and physical machine, wherein said plurality of virtual and physical machines comprise said new virtual and physical machine, and wherein said provisioning said plurality of virtual and physical machines comprises:
      receiving, by said computer processor from said user, a selection for an image file for use in said provisioning;
      generating, by said computer processor, a plan comprising a sequence of steps for configuring and installing said scripts for selected services;
      adding, by said computer processor, said plan and an associated request to a provisioning queue;
      retrieving, by said computer processor, said request from a head of said provisioning queue; and
      executing, by said computer processor each script of said scripts in a specified sequence;
   publishing, by said computer processor executing a first service of said plurality of services via an exchange of said associated unique exchanges associated with a first event of said plurality of events, a first message associated with said first event, wherein said exchange is executed via an application programming interface (API) provided by said first service;

routing, by said computer processor to a queue, of said unique queues, of a second service of said plurality of services, said first message;

notifying, by said computer processor, said second service of said first message within said queue;

enabling, by said computer processor based on said provisioning, said platform provided service, said customer provided service, and/or said third party provided service;

receiving, by said computer processor from a user during said provisioning, a selection comprising a sub-set of said platform provided service, said customer provided service, and/or said third party provided service; and enabling, by said computer processor, said selection.

6. The computer program product of claim 5, wherein said generating said plurality of services further comprises:

registering, by said computer processor, a group of said multiple event types that said plurality of services will publish in said event register;

registering, by said computer processor, an additional group of said multiple event types that said plurality of services will subscribe to in said event register;

generating, by said computer processor, unique queues for pairs of event types of said multiple event types and associated service types of said plurality of services connecting, by said computer processor, each queue of said unique queues to an associated unique exchange corresponding an associated event type of said multiple event types; and registering, by said computer processor in a service register, said plurality of services with information describing associated scripts of said scripts.

7. The computer program product of claim 5, wherein said plurality of services comprise dedicated services and shared services.

8. A computer system comprising a computer processor coupled to a computer-readable memory unit, said memory unit comprising instructions that when executed by the computer processor implements a physical machine based service improvement method comprising:

generating, by said computer processor, multiple event types for a plurality of events, wherein said generating said multiple event types comprises:

creating, by said computer processor, a unique exchange for each event type of said multiple event types; and registering, by said computer processor, said first event in an event register;

generating, by said computer processor, a plurality of services associated with virtual and physical hardware machine based software and hardware improvement services and said plurality of events, said plurality of services executed by a hardware infrastructure implemented by a controller server comprising a specified hardware configuration for enabling a plurality of virtual and physical machines, said plurality of services comprising a platform provided service, a customer provided service, and/or a third party provided service, wherein said services comprise differing service types comprising: a public service type including a service available to all customers registered on managed infrastructure as a service (MIAAS) platform; a private service type including a service available to a pre-specified set of customers; an untrusted service type including an untrusted service that is untrusted and is not allowed to perform any actions on an associated platform; and a trusted service type including a service that may perform actions on said associated platform; and wherein said generating said plurality of services comprises:

uploading, by said computer processor via a network, scripts associated with said plurality of services to a script repository database managed by a script execution manager;

registering, by said computer processor, said scripts and associated arguments in an event register;

installing, by said computer processor, said scripts in said script database repository;

configuring, by said computer processor, said scripts in said script database repository;

retrieving, in response to execution of a service host install script, bootstraps associated with said plurality of services;

uploading said scripts from said script database to a provisioning queue via said network; and executing, by said computer processor executing said script execution manager, said scripts;

creating, by said computer processor, unique queues for said differing service types paired with associated event types of said multiple event types;

connecting, by said computer processor, said unique queues to associated unique exchanges corresponding to each said event type;

provisioning, by said computer processor executing an install script and via said network in response to said executing, said plurality of virtual and physical machines associated with said plurality of services, wherein said provisioning comprises generating a resource configuration comprising CPU/memory resources required for implementing said plurality of virtual and physical machines for use in said provisioning, and wherein said provisioning said plurality of virtual and physical machines comprises creating a new virtual and physical machine by;

receiving, from a user, a selection for one or more virtual and physical hardware machine based software and hardware improvement services of said plurality of services for application to a new virtual and physical machine;

selecting first CPU and memory resources required for configuring, via execution of a configure script, said new virtual and physical machine, said memory resources comprising a hard drive, dynamic random access memory, and read only memory; and installing said one or more virtual and physical hardware machine based software and hardware improvement services, said first CPU and memory resources, and a hardware infrastructure service in said new virtual and physical machine, wherein said plurality of virtual and physical machines comprise said new virtual and physical machine, and wherein said provisioning said plurality of virtual and physical machines comprises:

receiving, by said computer processor from said user, a selection for an image file for use in said provisioning;

generating, by said computer processor, a plan comprising a sequence of steps for configuring and installing said scripts for selected services;

adding, by said computer processor, said plan and an associated request to a provisioning queue;

retrieving, by said computer processor, said request from a head of said provisioning queue; and executing, by said computer processor each script of said scripts in a specified sequence;

publishing, by said computer processor executing a first service of said plurality of services via an exchange of said associated unique exchanges associated with a first event of said plurality of events, a first message associated with said first event, wherein said exchange is executed via an application programming interface (API) provided by said first service;

routing, by said computer processor to a queue, of said unique queues, of a second service of said plurality of services, said first message;

notifying, by said computer processor, said second service of said first message within said queue;

enabling, by said computer processor based on said provisioning, said platform provided service, said customer provided service, and/or said third party provided service;

receiving, by said computer processor from a user during said provisioning, a selection comprising a sub-set of said platform provided service, said customer provided service, and/or said third party provided service; and enabling, by said computer processor, said selection.

9. The computer system of claim 8, wherein said generating said plurality of services further comprises:

registering, by said computer processor, a group of said multiple event types that said plurality of services will publish in said event register;

registering, by said computer processor, an additional group of said multiple event types that said plurality of services will subscribe to in said event register;

generating, by said computer processor, unique queues for pairs of event types of said multiple event types and associated service types of said plurality of services connecting, by said computer processor, each queue of said unique queues to an associated unique exchange corresponding an associated event type of said multiple event types; and registering, by said computer processor in a service register, said plurality of services with information describing associated scripts of said scripts.

* * * * *